Figure 1:
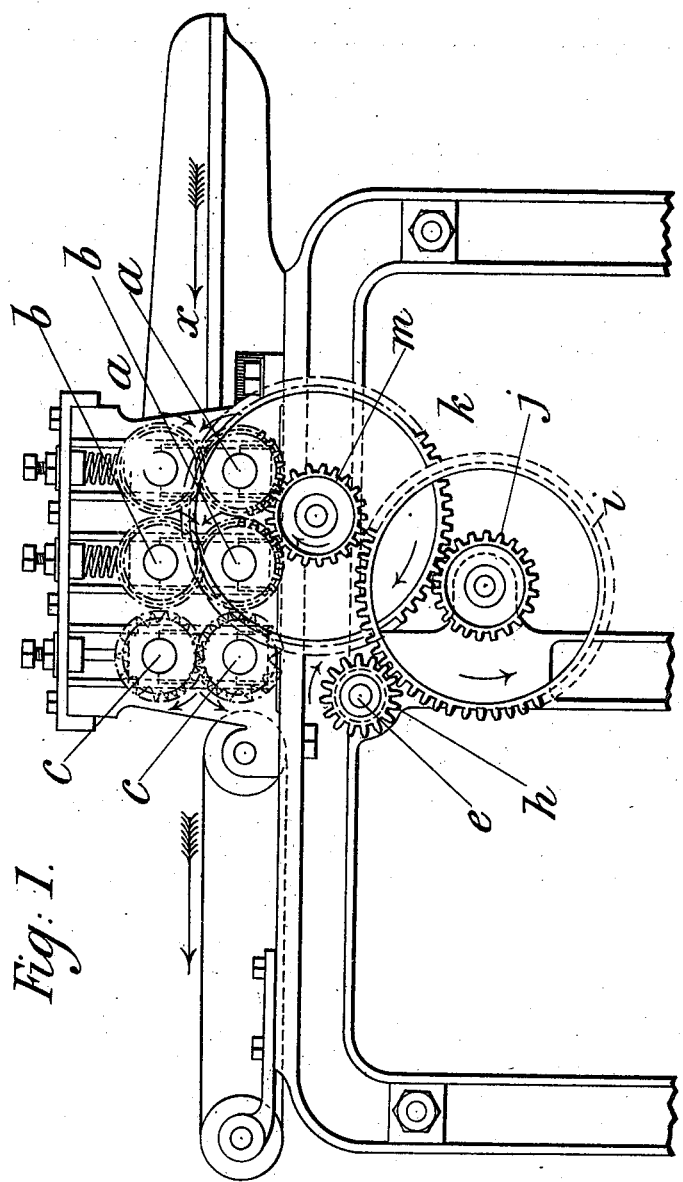

(No Model.) 3 Sheets—Sheet 1.
G. E. DONISTHORPE & T. BURROWS.
MACHINE FOR BREAKING, SCUTCHING, AND DECORTICATING FLAX, &c.

No. 504,204. Patented Aug. 29, 1893.

Witnesses:
John C. Wilson
Percy C. Bowen

Inventors:
George Edmund Donisthorpe &
Taylor Burrows,
By Whitman & Wilkinson,
Attys.

(No Model.) 3 Sheets—Sheet 2.
G. E. DONISTHORPE & T. BURROWS.
MACHINE FOR BREAKING, SCUTCHING, AND DECORTICATING FLAX, &c.
No. 504,204. Patented Aug. 29, 1893.
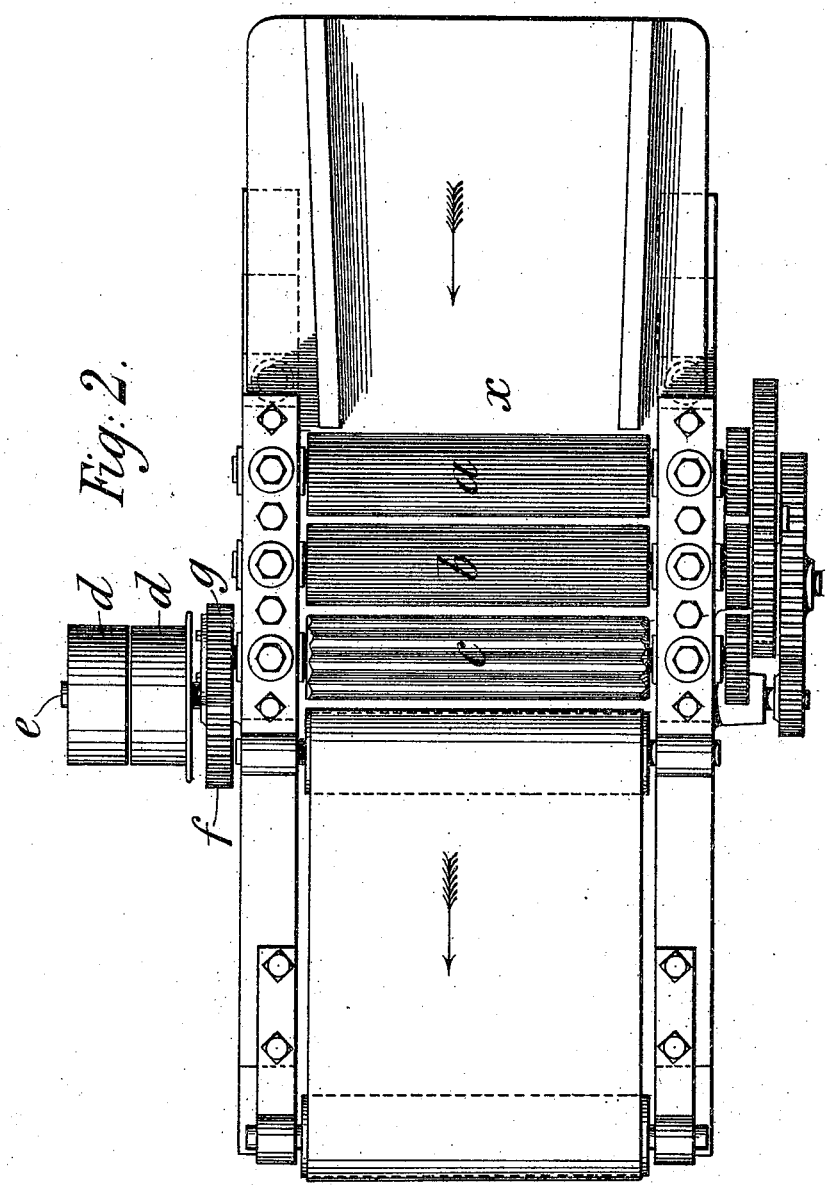

(No Model.) 3 Sheets—Sheet 3.
G. E. DONISTHORPE & T. BURROWS.
MACHINE FOR BREAKING, SCUTCHING, AND DECORTICATING FLAX, &c.
No. 504,204. Patented Aug. 29, 1893.
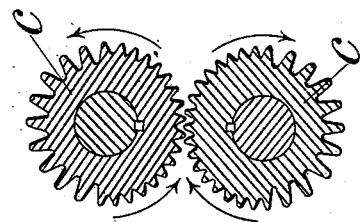
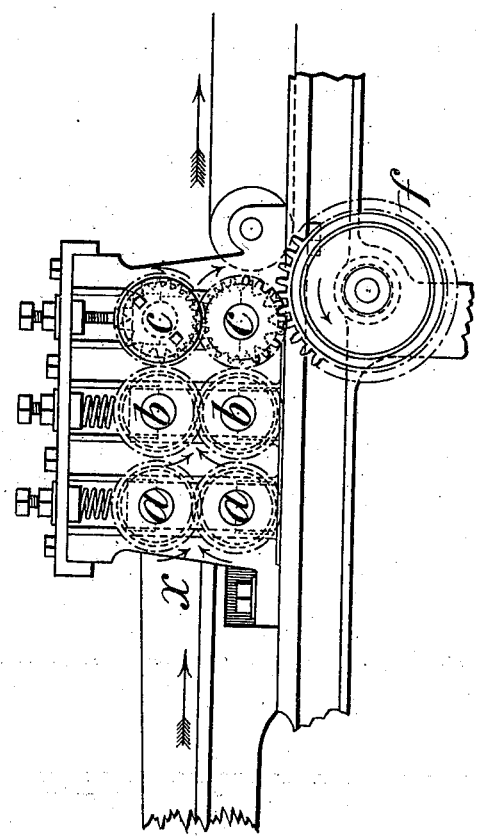
Witnesses. Inventors.

United States Patent Office.

GEORGE E. DONISTHORPE AND TAYLOR BURROWS, OF LONDON, ENGLAND.

MACHINE FOR BREAKING, SCUTCHING, AND DECORTICATING FLAX, &c.

SPECIFICATION forming part of Letters Patent No. 504,204, dated August 29, 1893.

Application filed November 2, 1892. Serial No. 450,753. (No model.) Patented in England February 4, 1892, No. 2,168.

*To all whom it may concern:*

Be it known that we, GEORGE EDMUND DONISTHORPE, merchant, residing at 12 Oat Lane, and TAYLOR BURROWS, engineer, residing at 88 Upper Kennington Lane, London, in the county of Surrey, England, subjects of the Queen of Great Britain, have invented Improvements in Machines for Breaking, Scutching, and Decorticating Flax, Rhea, (China-Grass,) and Similar Fibers, (for which we have obtained Letters Patent in Great Britain, No. 2,168, dated February 4, 1892,) of which the following is a specification.

This invention relates to machinery or apparatus for treating flax, rhea and similar fibrous stalks or plants, that is to break and decorticate same in recovering and separating the useful fiber from the bark or woody part and non-fibrous matter.

Our present invention is as follows:—The fibrous stalks, &c., such as flax straw to be decorticated and freed from the bark, &c., are fed into our machine between any ordinary or suitable feed and crushing rollers (of any suitable construction) but advantageously two strong pairs of fluted feed rollers mounted in a suitable frame or standard. These rollers are made to slowly revolve and to give a firm grip or hold on the stalks, &c., fed therein between. Close to these feed rollers are arranged and mounted a pair (or more—if desired) of quickly revolving bladed or fluted rollers or cylindrical shaped devices of special construction which effect our desired object in the manner hereinafter set forth. Each roller of this pair of quickly revolving specially formed rollers has a series of radially projecting flutes, blades or surfaces which intersect with one another, that is the flutes or projections on the top roller intersect and enter (more or less) deeply between the corresponding projections on the lower roller—but never touch one another as the two rollers revolve—this being easily effected by the adjustment of the bearings of these rollers or by any other suitable mechanical means.

Now a very essential feature of our present invention consists in making the said radial projections, flutes or blades (on these rollers) set closely together at one part and open or farther away from each other at another part, the top roller being identical in this particular with the lower roller (or vice versa) and the two rollers are so mounted with relation to each other that only close set flutes or blades on the one can intersect with identically close set flutes or blades on the other and similarly with regard to the coarse or more open set flutes or blades.

In order that our present invention may be easily understood and readily carried into practice we will proceed to further describe same with reference to the drawings hereunto annexed In the drawings, Figure 1 is a side elevation of our improved machine—the two pairs of feed crushing rollers and the pair of rubbing-stripping rollers being shown in dotted lines. Fig. 2 is a plan of Fig. 1. Fig. 3 is a "local" side elevation of the opposite side of the machine to Fig. 1. Fig. 4 is a cross sectional view of the rubbing-stripping rollers on a larger scale than the other figures.

Similar letters of reference indicate corresponding parts throughout.

$a\ a$ are the first pair of feed-crushing rollers, and $b\ b$ are the second pair of feed-crushing rollers.

$c\ c$ are the varying fluted or bladed rollers which give the alternating action on the crushed stalks, &c., to rub, beat, scrape and strip off the pellicle or woody and non-fibrous material.

$d\ d$ are fast and loose pulleys on the main driving shaft $e$.

$f$ is a large spur wheel (on the main shaft $e$) the teeth of which mesh with and revolve the toothed wheel $g$ fixed on the lower roller $c$. A toothed wheel on the opposite end of the lower roller $c$ meshes with and revolves a toothed wheel fixed on the end of the upper roller $c$. Thus the two rollers $c\ c$ are revolved identically at a very high speed say forty times the speed of the feed rollers $a\ a$ and $b\ b$. A second and small cog wheel $h$ on the main shaft $e$ actuates a train of wheels $i\ j\ k\ m$ which gear down the speed and the last wheel $m$ of which slowly rotates the two pairs of feed crushing rollers $a\ a$ and $b\ b$. Or these several pairs of rollers $a\ b$ and $c$ may be revolved in any other suitable manner and at the relative speeds of about forty revolutions of $c$ to one of $a$ and $b$ or any other suitable relative proportions. The second pair of feed crushing rollers may be dispensed with or more than two pairs may be used if desired.

The operation is as follows:—The flax straws or other stalks, &c., are fed on at $x$ and are seized and crushed between the rollers $a$ $a$ and then again between rollers $b$ $b$ (both of which are strong pressing pairs of rollers) and the fibrous material thus crushed is presented to the alternating action of the quickly revolving rubbing stripping rollers $c c$. By reason of the quickly varying action of these rollers $c$ $c$ on the material the pellicle woody and non fibrous part is beaten, rubbed, scraped and stripped off and the same drops to the ground leaving the extracted fiber almost perfectly stripped and scutched (by passing in one operation right through the machine) and ready for the next operation of opening or hackling, combing, &c.; or the resulting fiber from this machine may if desired for some purposes be further treated on another scutching machine to further perfect the scutching.

We would remark that we do not limit ourselves to only two varying depths of blades or flutes on each roller $c$ $c$.

Having thus described our invention, what we claim as new, and desire to secure by Letters Patent of the United States, is—

1. In a machine for breaking, decorticating and scutching or partially scutching flax, rhea and other fibrous plants, the combination with a feeding device, of a pair of fluted rollers, each of said rollers having blades or flutes of varying height similarly disposed to the blades or flutes on the other roller, and the said rollers being so placed that the blades of one project into the grooves between the blades of the other; and gearing between the two rollers whereby each is adapted to maintain the same speed relative to the other, so that the blades of the one may not come into contact with those of the other, substantially as described.

2. In a machine for breaking, decorticating and scutching or partially scutching flax, rhea and other fibrous plants, the combination with a plurality of feeding and crushing rollers revolving at a comparatively slow speed, of a pair of rapidly revolving fluted rollers, each of said rollers having blades or flutes of varying height similarly disposed to the blades or flutes on the other roller, and the said rollers being so placed that the blades of one project into the grooves between the blades of the other; and gearing between the two rollers whereby each is adapted to maintain the same speed relative to the other, so that the blades of the one may not come into contact with those of the other, substantially as described.

G. E. DONISTHORPE.
TAYLOR BURROWS.

Witnesses:
HENRY BIRKBECK,
34 *Southampton Buildings, London, England,*
*Chartered Patent Agent.*
THOMAS LAKE,
17 *Gracechurch Street, London, Notary's Clerk.*